May 23, 1961
R. J. SCHREINER
2,985,298
APPARATUS FOR EVALUATING THE PRINTING OF
MACHINE READABLE DOCUMENTS
Filed April 1, 1960
3 Sheets-Sheet 2
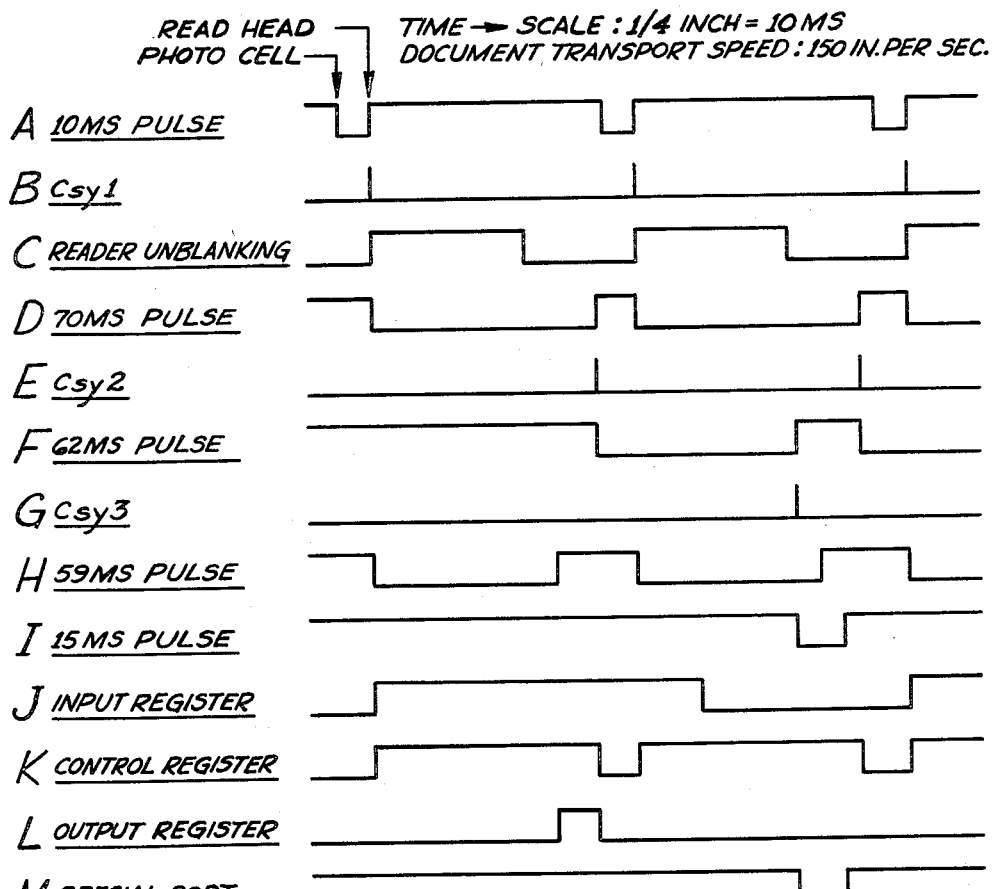
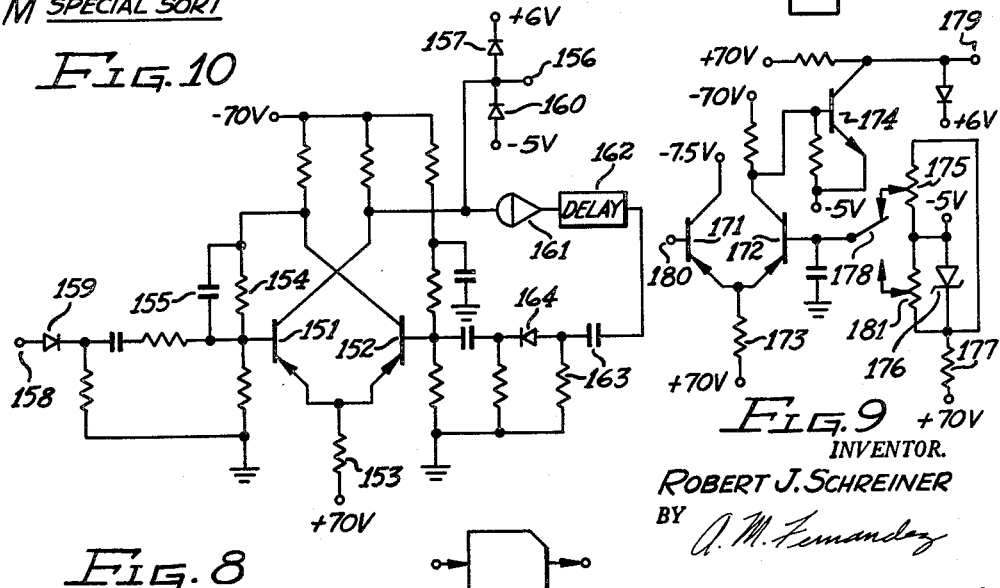
INVENTOR.
ROBERT J. SCHREINER
BY
ATTORNEY

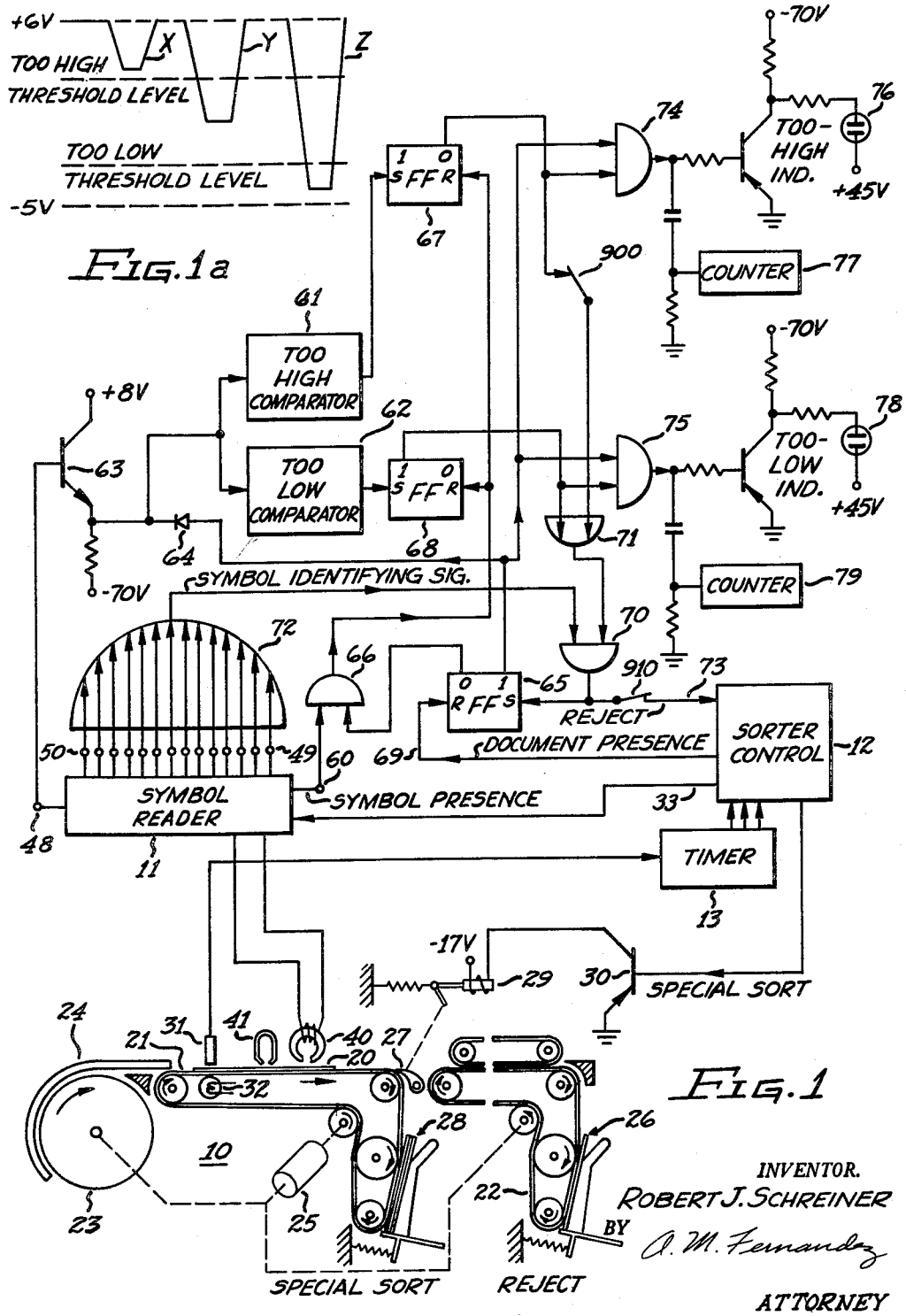

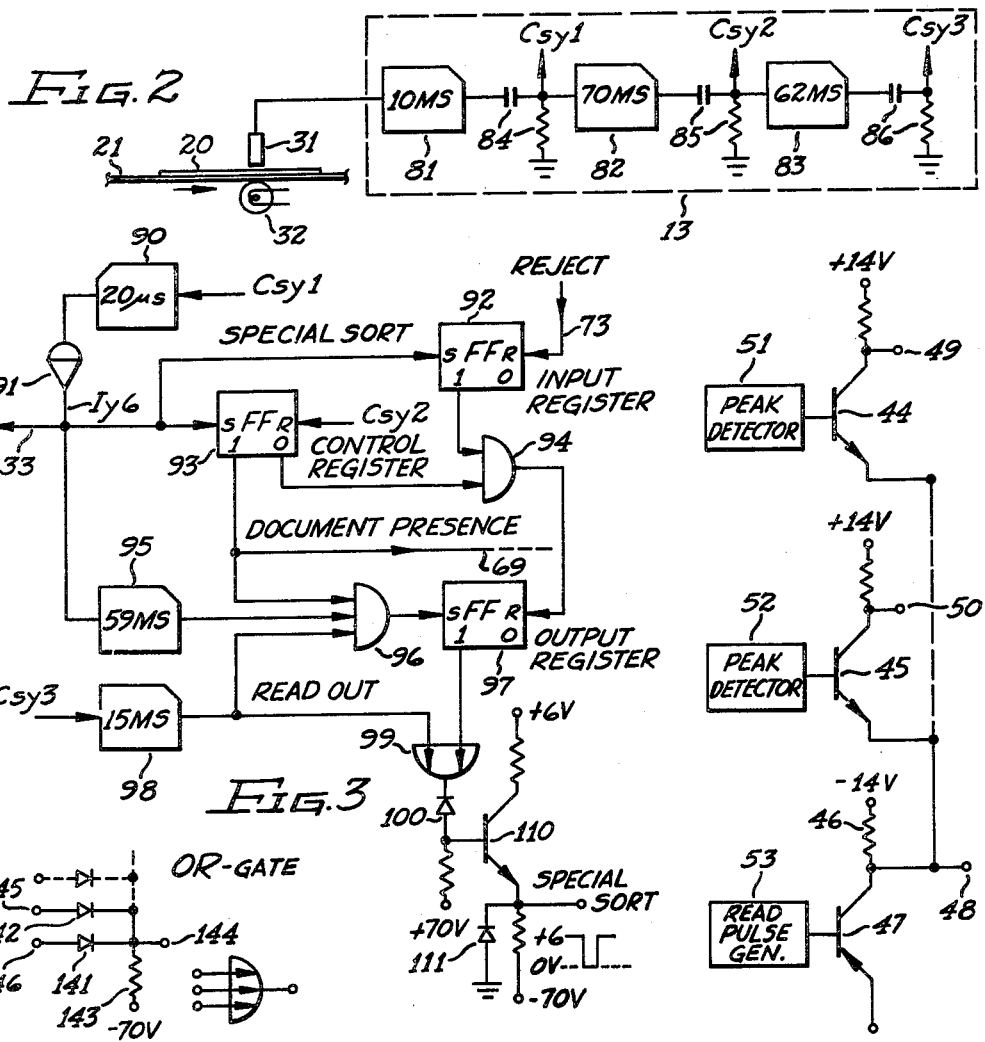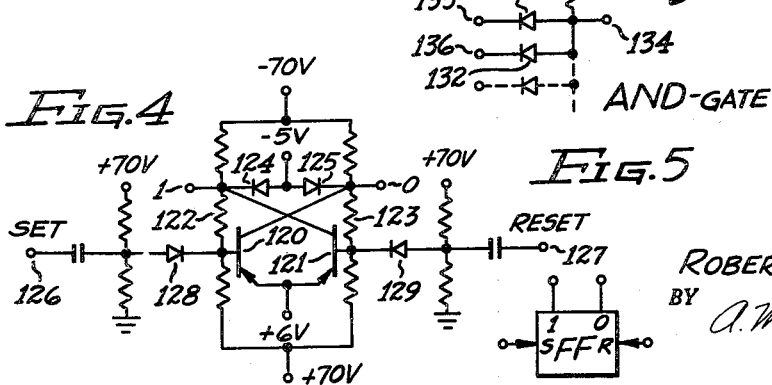

United States Patent Office 2,985,298
Patented May 23, 1961

2,985,298
APPARATUS FOR EVALUATING THE PRINTING OF MACHINE READABLE DOCUMENTS
Robert J. Schreiner, Palo Alto, Calif., assignor to General Electric Company, a corporation of New York
Filed Apr. 1, 1960, Ser. No. 19,216
12 Claims. (Cl. 209—72)

The present invention relates to apparatus for automatically evaluating the level of signals derived from machine readable documents, for separating documents bearing symbols the signal levels of which do not fall within predetermined limits and for providing a visual indication as to whether a document separated bears a symbol which produces a signal level that is too high or too low.

With the advent of high speed electronic data processing systems, advancements have been made in the art of reading symbols printed on documents for the purpose of electronically translating the data read to a data processor and to apparatus for automatically sorting the documents. For example, in an automated banking system the commercial bank checks of each customer bear an account number, a transaction code and a routing number in addition to the banks branch number, all of which are printed in advance with magnetizable ink near the bottom edge of each check. After a check is drawn and presented for payment, the dollar amount is similarly printed or typed on the check. Thereafter, the symbols on the check are magnetized and read by an electronic apparatus. Such an apparatus is disclosed in a Patent No. 2,924,812 issued to Philip E. Merritt and Carroll M. Steele on February 9, 1960.

The data read from the checks may be used to sort them according to their account numbers and transaction codes before they are processed.

The reading apparatus employed is capable of recognizing waveforms derived from symbols which are printed with substantially large variations in shape or density. However, whether the apparatus be of a magnetic or photoelectric sensor type, some quality control over the printing process must be maintained in order to assure that the signals derived from the printed symbols do not vary beyond the substantially wide limits which can be tolerated. Quality control may best be maintained on a continual basis by the printer by systematically analyzing in detail samples of documents printed. Nevertheless, the user of such printed documents and the printer himself may wish to conduct a less detailed quality control test on a continual or spot check basis by evaluating the level of signals derived from printed symbols on every document or on sample groups of documents.

Accordingly, the object of this invention is to provide an apparatus for evaluating the quality of printing on documents by separating all documents bearing printed symbols which produce signal levels which are not within specified limits.

A further object is to provide an apparatus for separating documents which bear symbols producing signal levels above a predetermined level from documents which bear symbols producing signal levels below a predetermined level.

Another object is to provide an apparatus for monitoring the quality of printed symbols on documents during on-line operations of sorting or data processing.

These and other objects of the invention are achieved in an apparatus wherein the documents to be evaluated are individually transported through a symbol reader to a document sorter. The signal waveform derived from each symbol of a given document is translated to a pair of voltage comparators, one comparator being adjusted for the upper limit of the signal amplitude that is acceptable and the other being adjusted for the lower limit. A separate memory device or flip-flop is connected to each comparator to store a determination of whether any signal on a given document is too high or too low. If any signal is too high or too low, the signal stored in the associated flip-flop is employed to activate circuitry which causes the document to be deposited in a reject pocket of the sorter. In order to separate documents bearing symbols which produce signals that are too high in amplitude from documents bearing symbols which produce signals which are too low, one of the separate memory devices or flip-flops may be disconnected and all of the documents analyzed and rejected with both flip-flops connected are again analyzed. In that manner the documents which bear printed symbols that produce signals that do not fall within predetermined limits are separated into two groups, one group of documents bearing symbols which produce signals above an upper limit and another group of documents bearing symbols which produce signals below a lower limit. For monitoring on-line operations, the high-low comparator section is disconnected from a sorter control section. In that mode of operation the high-low section continues to operate a high-low indicating section while the sorter is controlled by other signals applied to a sorter control section.

Other objects of the invention will become apparent from the following description with reference to the drawings in which:

Fig. 1 is a schematic diagram of an embodiment of the present invention and Fig. 1a is a graph showing the relative excursions of three signals as compared to predetermined threshold levels;

Fig. 2 illustrates schematically the manner in which timing signals are derived;

Fig. 3 illustrates schematically a sorter control which may be employed in the system of Fig. 1;

Fig. 4 illustrates a circuit diagram of a flip-flop and a symbol employed to represent a flip-flop;

Fig. 5 illustrates a circuit diagram of an AND-gate and a symbol employed to represent an AND-gate;

Fig. 6 illustrates a circuit diagram of an OR-gate and a symbol employed to represent an OR-gate;

Fig. 7 illustrates a circuit diagram of a voltage comparator employed in the symbol reader of Fig. 1;

Fig. 8 illustrates a circuit diagram of a monostable multivibrator and a symbol employed to represent a monostable multivibrator;

Fig. 9 illustrates a circuit diagram of a too-low or too-high comparator of Fig. 1; and Fig. 10 illustrates a timing diagram for the operation of the invention illustrated in Fig. 1.

An embodiment of the present invention will now be described with reference to Fig. 1. It includes a mechanical document sorter 10, an electronic symbol reader 11, an electronic sorter control 12 and a timing mechanism 13. Documents, such as a document 20, are conveyed through the sorter by endless belts 21 and 22. Means not shown feed documents one at a time into a channel between a rotating drum 23 and a guide 24. The endless belts 21 and 22 and the rotating drum 23 are driven synchronously by a motor 25. In operation, the documents individually fed to the conveyor belt 21 are transferred to the conveyor belt 22 and deposited in a Reject pocket 26 unless a mechanical gate 27 is open at the time the leading edge of the document leaves the conveyor belt 21. If the mechanical gate 27 is open at the time a leading edge of a document is to be transferred to the belt 22, it is deposited in a Special Sort pocket 28. The mechanical gate 27 is controlled by a spring biased solenoid 29 which is energized through a transistor switch 30 by the sorter control 12.

The sorter control 12 is synchronized by the timer 13 so that a Special Sort signal is not transmitted to the transistor switch 30 until the leading edge of the document 20 reaches the mechanical gate 27. The timer 13 is in turn synchronized by a signal from a photoelectric cell 31 which detects the presence of the leading edge of the document 20 on the conveyor belt 21. That is accomplished by transmitting light from a source 32 to the photoelectric cell 31 through a slot not shown along the center of the endless belt 21. When the leading edge of the document 20 on the belt 21 passes between the photoelectric cell 31 and the light source 32, the light to the cell 31 is interrupted and an electrical signal is transmitted to the timer 13.

After the presence of the document has been detected and the timer 13 initiates the opertion of the sorter control 12, a signal Iy6 is transmitted through a lead 33 to the symbol reader 11. The Iy6 signal triggers a monostable multivibrator in the symbol reader 11 the output of which enables the symbol reader to receive input signals from an electromagnetic transducer 40. The output of the monostable multivibrator in the symbol reader may be conveniently referred to as an Unblanking Pulse. As a document is conveyed by the belt 21 from the photoelectric cell 31 to the transducer 40, the document 20 is scanned by a permanent magnet 41 which uniformly magnetizes all of the symbols printed on the document with magnetizable ink. Accordingly, as a given magnetic symbol is scanned by the transducer 40, a signal wave characteristic of the magnetic symbol is produced and transmitted to the symbol reader 11. It should be recognized that if the transducer 40 were of a photoelectric type, the magnet 41 would not be employed and the symbols would not need to be printed with magnetizable ink.

*Symbol reader*

In the symbol reader 11, a given signal from the transducer 40 is stored in a delay line having a number of taps so that the waveform stored therein may be sampled simultaneously at a number of points. The samples of the waveform are then fed to a plurality of correlation networks each of which produces an output signal. However, each correlation network is designed to recognize a different waveform which is characteristic of a different symbol by producing an output signal greater in amplitude than is produced by any other correlation network. Thus, for a given symbol, a particular correlation network associated with that symbol, which may be referred to as the auto-correlation network, produces an output signal greater in amplitude than any other correlation network, other correlation networks being referred to as cross-correlation networks.

The peak or maximum amplitude of each correlation signal is detected and stored in a peak detector, such as detectors 51 and 52 shown in Fig. 7, until a read pulse is generated. At that time, the output signal of each peak detector is compared to determine which is storing a signal having the greatest amplitude relative to a —5 volt source. A suitable gated comparator is illustrated in Fig. 7. It consists of a plurality of transistor amplifiers 44 and 45 having a common emitter resistor 46 and a gating transistor 47. The transistor 47 is biased to be normally conducting during which time an output terminal 48 is held at substantially +6 volts. The peak detectors are reset to a —5 volt potential just prior to receiving correlation signals from a signal scanned so that the base electrodes of the transistors 44 and 45 are driven in a positive direction from a —5 volt potential to a maximum potential somewhere between —5 volts and +6 volts. Since the emitters of the NPN transistors 44 and 45, which are directly connected to the output terminal 48, are at +6 volts while the transistor 47 is conducting, the transistors 44 and 45 are cut off and output terminals 49 and 50 connected to the collector electrodes of respective transistors 44 and 45 are held at substantially +14 volts.

After the peak detectors 51 and 52 have detected and stored the maximum correlation signals in their respective channels, a read pulse generator 53 applies a signal more positive than +6 volts to the base of the transistor 47 thereby cutting it off. When the transistor 47 is cut off, the output terminal 48 drops from a +6 volt level to a level between approximately +6 volts and —5 volts depending on the level of the greatest voltage signal stored in the peak detectors 51 and 52. Assuming that the peak detector 52 is storing the greatest signal, such as a +3 volt signal, while the other peak detector is storing a signal of about +2 volts, the transistor 45 will conduct and drive the output terminal 48 to substantially +3 volt level thereby maintaining the transistor 44 cut off. Accordingly, the output terminal 49 remains at substantially +14 volts while the output terminal 50 drops from a +14 volt level thereby indicating that the symbol read is that symbol associated with the output terminal 50. Because the output terminal 48 is driven to approximately the level of the greatest signal stored by the peak detectors regardless of which peak detector is storing that greatest signal, the auto-correlation signal from every symbol read is presented at the output terminal 48.

The aforementioned Patent No. 2,924,812 provides a more complete description of the symbol reader. It is sufficient for the present invention to understand that the symbol reader 11 in Fig. 1 provides a signal at the output terminal 48 in response to each symbol read in a given document, that signal being proportionate to the auto-correlation signal which produces a symbol identifying signal at an output terminal such as the output terminal 49. There are as many output terminals, such as the output terminals 49 and 50, as there are correlation channels and there are, of course, as many correlation channels as there are different symbols to be recognized.

In addition to the symbol identifying signals and the auto-correlation signal of each symbol at the output terminal 48, the symbol reader provides a Symbol Presence signal at an output terminal 60 when a symbol is being scanned by the transducer 40. That Symbol Presence signal is a positive-going (—5 to +6 volt) signal.

*Evaluating section*

The auto-correlation signals presented at the output terminal 48 are translated to input terminals of a too-high comparator 61 and a too-low comparator 62 by a gated emitter follower consisting of an emitter follower 63 and a diode 64. When the diode 64 is forward biased, the output of the emitter follower 63 is clamped at substantially +6 volts. The diode 64 is forward biased only while a flip-flop 65 is set. While the flip-flop 65 is set, its 0 or false output terminal is at —5 volts and an AND-gate 66 can not transmit Symbol Presence signals from the terminal 60 to reset input terminals of a pair of flip-flops 67 and 68. The flip-flops 67 and 68 are set by output signals from the respective comparators 61 and 62.

The function of the comparators 61 and 62 is to determine whether the auto-correlation signal of a given symbol falls within predetermined limits. As noted hereinbefore, an auto-correlation signal is a negative-going pulse always starting at +6 volts and terminating at a voltage corresponding to the highest voltage stored on any one of the correlation storage peak detectors. In the illustrated embodiment, that signal is substantially the same as the auto-correlation signal stored in the peak detector of the auto-correlation channel. However, it should be understood that since the threshold levels of the comparators 61 and 62 are adjustable, the auto-correlation signals presented at the output terminal 48 need only be proportionate to the auto-correlation signal stored in the peak detector of the auto-correlation channel.

The function of the flip-flops 67 and 68 is to store signals indicating that an auto-correlation signal derived from a given document is either to high or too low. That information is stored until a new document passes between the photoelectric cell 31 and the light source 32. When the presence of a new document is sensed, the timer 13 is recycled and the sorter control 12 transmits a Document Presence signal to the reset input terminal of the flip-flop 65. When the flip-flop 65 is reset, the AND-gate 66 is enabled and Symbol Presence signals presented at the output terminal 60 are transmitted through the AND-gate 66 to the reset input terminal of the flip-flops 67 and 68, thereby resetting the flip-flops 67 and 68 before the first auto-correlation signal is translated to the comparators 61 and 62.

The comparators 61 and 62 function by comparing the potential level of the auto-correlation signal from the output terminal 48 with predetermined potential levels established by separate adjustment in each comparator. Since the auto-correlation signals are negative going from a +6 volt level to some negative potential that can not be more negative than −5 volts, the too-high comparator 61 is adjusted to compare the auto-correlation signal level with a potential level which is too high whereas the too-low comparator is adjusted to compare the auto-correlation signal with a voltage level which is too low. Accordingly, an auto-correlation signal which is too low will, of necessity, pass through the threshold level of both the too-high comparator and the too-low comparator. An auto-correlation signal which is too high, on the other hand, will not pass through the threshold level of either the too-high comparator or the too-low comparator, but an auto-correlation signal which falls between the limits established by the threshold levels of the two comparators will pass through the threshold level of the too-high comparator but not the too-low comparator.

The use of the relative terms "too high" and "too low" may be more clearly understood by referring to the graph of Fig. 1a wherein too high, normal and too low auto-correlation signals X, Y and Z, respectively, are shown compared with the too-high and too-low threshold levels of the comparators. It should be noted that the levels of the signals X, Y and Z are referenced to a −5 volt level.

In operation, an auto-correlation signal which is too high will fail to cause either the too-high comparator 61 or the too-low comparator 62 to set either the flip-flop 67 or the flip-flop 68. The false output terminal of the flip-flop 67 remains at a +6 volt potential while the true output terminal of the flip-flop 68 remains at a −5 volt level. The respective output terminals of both of the flip-flops 67 and 68 are connected to an input terminal of an AND-gate 70 through an OR-gate 71.

While the too-high auto-correlation signal is present at the output terminal 48, a Symbol Identifying signal is present at an output terminal of the symbol reader, such as the output terminal 49, associated with the symbol corresponding to the particular auto-correlation signal. That signal is transmitted through an OR-gate 72 to the AND-gate 70. The enabled AND-gate 70 then transmits a +6 volt signal to the set input terminal of the flip-flop 65 and to the sorter control 12.

When the flip-flop 65 is set, the diode 64 is forward biased and the input terminals of the too-high and too-low comparators are clamped at +6 volts. The +6 volt signal from the true side of the flip-flop 65 is also transmitted to a pair of AND-gates 74 and 75. Since the auto-correlation signal compared is too high, only the AND-gate 74 transmits a +6 volts signal to ignite a neon tube indicator 76 and to advance a count registered in a counter 77.

The reason a Symbol Identifying signal from the symbol reader is transmitted through the OR-gate 72 to the AND-gate 70 when that signal corresponds identically in time to the auto-correlation output signal evaluated is that small particles of iron in the document and small blots or spatters of ink may produce signals large enough to cause the symbol reader to generate a read pulse and a Symbol Presence signal. The signal derived by scanning such extraneous magnetic material will invariably be too low and, although possibly so low or so located that it would not produce a false Symbol Identifying signal, it would be evaluated as being too-low, thereby giving a false indication of the quality of the printing on the document. Accordingly, by requiring that a Symbol Identifying signal be present at the AND-gate 70 in order for a Reject signal to be transmitted, the document will not be rejected and a too-low indication will not be registered.

No further action takes place until the leading edge of the next document passes between the photoelectric cell 31 and the light source 32. At that time a Document Presence signal is generated as described hereinbefore and the flip-flop 65 is reset. The AND-gate 66 is again enabled so that the Symbol Presence signal presented at the output terminal 60 is transmitted to the reset input terminals of the flip-flops 67 and 68. Resetting the flip-flop 65 reverse biases the diode 64 and enables auto-correlation signals presented at the output terminal 48 to be transmitted to the comparators 61 and 62. Assuming that the first symbol of the document produces a normal auto-correlation signal that is within the too-high and too-low threshold levels of the comparators, only the too-high comparator will transmit a signal to the set input terminal of the flip-flop 67 and the flip-flop 68 remains in the reset condition. Under those conditions neither the flip-flop 67 nor the flip-flop 68 transmits a +6 volt signal to the AND-gate 70 through the OR-gate 71. Therefore the flip-flop 65 is not set and the Reject signal is not transmitted to the sorter control 12.

Assuming that the second symbol of the same document produces an auto-correlation signal which is too low, both the too-high comparator 61 and the too-low comparator 62 will transmit a +6 volt signal to the flip-flops 67 and 68. Under those conditions only the flip-flop 68 transmits a +6 volt signal to the AND-gate 70 through the OR-gate 71. A Reject signal is then transmitted to the sorter control 12 and to the set input terminal of the flip-flop 65. When the flip-flop 65 is set, both the AND-gates 74 and 75 are enabled but since only the flip-flop 68 is transmitting a +6 volt signal only the AND-gate 75 transmits a +6 volt signal to ignite an indicating neon lamp 78 and to advance a count registered in a counter 79.

The high-low evaluating section is disabled after the first out-of-limit signal is observed so that it is not possible to determine whether subsequent symbols on the same document produce signals which are too high or too low. However, that is not a serious deficiency since the printing evaluation is normally performed on symbols which are all printed at the same time under the same conditions and it is not very probable that the symbols on any one document would produce signals which vary over the whole range from too high to too low. Accordingly, if a symbol on a document produces a signal which is too high, for instance, it can be safely assumed that some or all of the remaining symbols also produce signals which are too high. The printer may then make a more detailed analysis of the symbols on the document to determine the reason.

*Timing*

Fig. 2 illustrates schematically the manner in which the timer 13 of Fig. 1 generates timing pulses Csy1, Csy2 and Csy3. The timer consists of three monostable multivibrators 81, 82 and 83 connected in cascade. The first monostable multivibrator produces a negative-going (+6 to −5 volt) signal which is 10 milliseconds long in duration. The trailing edge of that pulse, which is positive going, is differentiated by a differentiating circuit 84 and transmitted as a Csy1 pulse to the monostable multivibrator 82. The monostable multivibrator 82 produces a negative-going pulse 70 milliseconds long in a similar manner. A differentiating circuit 85 differentiates the trailing edge of the 70 millisecond pulse to produce a Csy2 pulse which triggers the monostable multivibrator 83. The latter produces a negative-going 62 millisecond pulse. A differentiating circuit 86 differentiates the trailing edge of the 62 millisecond pulse to produce a Csy3 pulse.

The ten millisecond time duration of the pulse derived from the monostable multivibrator 81 is selected in the illustrated embodiment of the invention to permit the leading edge of a document to travel from the photoelectric cell 31 to the transducer 40 before generating a Csy1 pulse. The 70 millisecond time duration of the pulse derived from the monostable multivibrator 82 is selected to permit all of the symbols of a document to be scanned by the transducer 40 before generating a Csy2 pulse and the 62 millisecond time duration of the pulse derived from the monostable multivibrator 83 is selected to permit the leading edge of the document to reach the mechanical gate 27 before the Csy3 pulse is generated.

*Sorter control*

The Csy1 pulse is applied to a monostable multivibrator 90 illustrated in Fig. 3 of the sorter control. The monostable multivibrator 90 produces a negative-going (+6 to −5 volt) signal having a duration of 20 microseconds. That negative-going pulse is inverted by an amplifier 91 to produce a positive-going (−5 to +6 volt) signal Iy6 which is transmitted via the line 33 to the symbol reader as described hereinbefore and to the set input terminals of a pair of flip-flops 92 and 93. When the flip-flop 92 of an input register is set, a special sort command is stored therein. The logic of the sorter control is that each document evaluated which falls between the levels established by the too-high and too-low comparators should be deposited in the Special Sort pocket 28 of Fig. 1. Documents which do not fall within the prescribed limits should be deposited in the Reject pocket 26 of Fig. 1 in response to a Reject signal transmitted via the line 73 to the reset input terminal of the input register thereby storing a reject command. Setting the flip-flop 93 disables an AND-gate 94 and transmits a +6 volt Document Presence signal via the line 69 to the flip-flop 65 in Fig. 1.

The Iy6 pulse from the inverter 91 is also transmitted to the monostable multivibrator 95 which produces a negative-going (+6 to −5 volt) signal having a duration of 59 milliseconds to disable an AND-gate 96. At the termination of the 59 millisecond period, the AND-gate 96 is again enabled and a +6 volt signal is transmitted to the set input terminal of a flip-flop 97 in a command or output register. Setting the flip-flop 97 stores a reject command.

During the 70 millisecond time interval between the occurrence of a Csy1 pulse and a Csy2 pulse, all of the symbols printed on a given document are read and evaluated to determine whether any one symbol falls within the high and low levels established by the comparators 61 and 62 of Fig. 1. Assuming all of the symbols of a document being read fall within the prescribed limits, a Reject signal is not transmitted to the input register flip-flop 92 which remains set. Therefore, when a Csy2 pulse resets the control register flip-flop 93, the AND-gate 94 transmits a +6 volt signal to the reset input terminal of the output register 97, thereby transferring a Special Sort command stored in the input register to the output register. It should be noted, however, that the logic levels are reversed between the input register and the output register. That is to say, in the input register, a Special Sort command consists of a stored bit 1 or a +6 volt logic level at the true output terminal of the input register flip-flop 92 whereas in the output register flip-flop 97 it consists of a stored bit 0 or a −5 volt logic level at the true output terminal of the output register flip-flop 97.

Upon the occurrence of a Csy3 pulse, a monostable multivibrator 98 is triggered to generate a negative-going (+6 to −5 volt) Read Out pulse having a duration of 15 milliseconds. That Read Out pulse disables the AND-gate 96 but enables an OR-gate 99 to transmit a negative-going signal through a diode 100 to an emitter follower 110. Owing to the reversal of the logic levels, the OR-gate 99 functions as an AND-gate. Accordingly, the negative-going Read Out pulse can not be transferred to the emitter follower 110 except while the flip-flop 97 is reset. The output terminal of the emitter follower 110 is clamped to ground potential by a diode 111 so that the Special Sort output signal is a negative going (+6 to 0 volt) pulse having a duration of 15 milliseconds. The Special Sort signal is transmitted to the base electrode of the transistor switch 30 in Fig. 1 to actuate the relay 29, open the mechanical gate 27 and deposit the document in the Special Sort pocket 28.

If any one of the symbols of the document read does not produce a correlation signal which falls between the levels established by the comparators 61 and 62 in Fig. 1, the input register flip-flop 92 of Fig. 3 is reset before the control register flip-flop 93 is reset; therefore, when the AND-gate 94 is enabled by the control register flip-flop 93, the true output terminal of the input register flip-flop 92 is at −5 volts. Consequently, the output register flip-flop 97 is not reset and when the Read Out pulse is applied to the OR-gate 99, a negative-going pulse is not transmitted to the transistor switch 30 in Fig. 1 to open the gate 27. The document is then transported past the Special Sort pocket 28 and deposited in the Reject pocket 26.

*Flip-flop*

The circuit diagram of a flip-flop is shown in Fig. 4. It consists of a pair of common-emitted PNP amplifiers 120 and 121 cross coupled by a pair of resistors 122 and 123. The true and false output terminals are both clamped to a −5 volt potential by a pair of diodes 124 and 125 so that the output voltage swing of the true and false output terminals 1 and 0 vary from substantially a +6 volt level to substantially a −5 volt level. The set and reset input terminals 126 and 127 are coupled to the base electrodes of the corresponding transistors 120 and 121 by respective diodes 128 and 129 which are so connected as to transmit only positive-going input pulses. The symbol employed in Figs. 1 and 3 to represent a flip-flop is shown in Fig. 4.

*AND-gate*

Fig. 5 illustrates a circuit diagram of an AND-gate which comprises a plurality of diodes, such as diodes 131 and 132, having their anodes connected together and, through a resistor 133, to a +70 volt source. The junction between the anodes of the diodes are also connected to an output terminal 134. The cathodes of these diodes are connected to respective input terminals 135 and 136 to which, in the circuits to be described, desired voltages of either a −5 volts or +6 volts may be applied. The diodes have a very low internal impedance; therefore, a −5 volt signal presented at any one of the input terminals, such as the input terminal 135, is transmitted through the diode 131 and is presented at the output terminal 134. To change the output terminal 134 from −5 volts to +6 volts, all of the input terminals must be at a +6 volt level. The symbol employed to represent an AND-gate in Figs. 1 and 3 is illustrated in Fig. 5.

*OR-gate*

Fig. 6 illustrates a circuit diagram of an OR-gate which comprises a plurality of diodes, such as diodes 141 and 142, having their cathodes connected together and, through a resistor 143, to a —70 volt source. The junction between the cathodes of the diodes is also connected to an output terminal 144. Input terminals 145 and 146, which are connected to the anodes of the diodes, are normally maintained at either a —5 volt level or a +6 volt level. As in the diode AND-gate, the diodes 141 and 142 have very little internal impedance; therefore, when a +6 volt signal is applied to any one of the input terminals 145 and 146, a +6 volt potential is transmitted to the output terminal 144. The output terminal 144 is at a —5 volt level only when both input terminal 145 and the input terminal 146 are at —5 volt level. Accordingly, an OR-gate may function as an AND-gate if the logic levels are reversed and the —5 volt level normally employed to represent a bit 0 is used to represent a bit 1 and the +6 volt level normally employed to represent a bit 1 is used to represent a bit 0. A symbol employed in Figs. 1 and 3 to represent an OR-gate structure is illustrated in Fig. 6.

Monostable multivibrator

Fig. 8 illustrates a diagram of a circuit which may be employed as a monostable multivibrator in the present invention. The circuit is essentially a bistable multivibrator having its false output terminal connected to its reset input terminal through an inverter and a delay circuit. The bistable multivibrator comprises a pair of transistors 151 and 152 having a common emitter resistor 153 and a coupling from the collector of the second transistor 152 to the base of the first transistor 151 by a resistor 154 and a capacitor 155. The transistor 151 is normally conducting and the false output terminal 156 is clamped at a +6 volt level by a diode 157. A positive pulse applied at a set input terminal 158 is transmitted by a diode 159 to the base of the transistor 151, thereby cutting it off. When the transistor 151 is cut off, the transistor 152 is driven into conduction in a manner similar to all bistable multivibrators of this type and the false output terminal 156 is clamped at a —5 volts by a diode 160. The negative-going (+6 to —5 volt) signal is inverted by an inverting amplifier 161 and transmitted through a delay circuit 162 to a differentiating circuit 163 which produces a sharp positive-going pulse that is transmitted by a diode 164 to the base electrode of the transistor 152 thereby resetting the bistable multivibrator and returning the false output terminal 156 to a +6 volt potential. The time delay of the circuit 162 may be adjusted in a manner well known in the art to provide a negative pulse of the desired time duration at the false output terminal 156. The symbol employed in Figs. 2 and 3 to represent the monostable multivibrator is illustrated in Fig. 8. In Figs. 2 and 3, the time delay of each monostable multivibrator is indicated within the block symbols representing them.

Comparator

Fig. 9 illustrates a circuit diagram of a comparator which may be employed in the present embodiment of the invention. It comprises a voltage comparator consisting of two PNP transistors 171 and 172 having a common emitter resistor 173 and a switch consisting of a NPN transistor 174 which is biased to be cut off when the transistor 172 is not conducting and conducting at saturation when the transistor 172 is conducting. The latter is normally conducting during which time the transistor 171 is held cut off because its electrode is normally held at a +6 volt potential while its emitter electrode is driven below +6 volts by current through the common emitter resistor 173. The voltage level to which the emitters of the transistors 171 and 172 are normally driven is determined by an adjustment of a potentiometer 175 that is connected between a —5 volt source and a source of +6 volts relative to the —5 volt source.

As noted hereinbefore with reference to Fig. 1a, the auto-correlated signals from the symbol reader 11 (Fig. 1) are referenced to the —5 volts source and follow the variations of the —5 volt source. Therefore independent variations of the +6 volt source used throughout the system of Fig. 1 would have an effect on the comparator if employed to establish the threshold level of the comparator. In order to maintain the threshold level constant relative to the —5 volt source, the relative +6 volt source connected to the potentiometer 175 is provided by a Zener diode 176 connected to the —5 volt source and, through a series resistor 177, to a +70 volt source. The junction between the Zener diode 176 and the resistor 177 provides a source of +6 volts relative to the —5 volt source so that the threshold level coupled to the base electrode of the transistor 172 through a switch 178 always remains constant relative to the —5 volt level and the comparator provides a positive-going (—5 to +6 volt) signal at an output terminal 179 when an auto-correlation signal presented at an input terminal 180 goes below the threshold voltage level applied to the base electrode of the transistor 172. In that manner, the comparator circuit of Fig. 9 compares the maximum voltage level of an auto-correlation signal relative to the —5 volt level with a threshold level which is also relative to the —5 volt source. If the —5 volt source were to be designed so that it would not vary, the comparator would provide a comparison of the absolute voltage level with a standard level the absolute voltage of which would remain constant, but that is not necessary in the present embodiment of the invention.

A second potentiometer 181 is provided in order that the threshold level of the comparator may be switched from one predetermined level to another by operation of the switch 178.

The highest and the lowest auto-correlation signal produced by any symbol is either known or can be determined. Assuming it is desirable to accept all documents having symbols printed thereon from which signals may be derived within the range of 50% of the lowest auto-correlation signal to 200% of the highest auto- correlation signal, the too-high comparator in the system of Fig. 1 is set for a threshold level corresponding to 200% of the auto-correlation signal produced by the symbol which produces the highest auto-correlation signal and the too-low comparator is set for a threshold level corresponding to 50% of the auto-correlation signal produced by the symbol which produces the lowest auto-correlation. It may be desirable to set narrower limits in order to determine which documents bear printed symbols that will satisfy a higher standard. To accomplish that it is only necessary to change the threshold levels of 200% and 50% to, for instance, 175% and 75%. The second potentiometer associated with each comparator may be used to establish the narrower limits.

The comparator circuit and the other circuits described hereinbefore are only illustrative of specific circuits which are preferred or suitable for the specific embodiment of the invention. Other well known circuits, which in combination will perform the same overall function, may be employed.

Operation

A complete operation of the invention illustrated in Fig. 1 will now be briefly described with reference to the timing diagram in Fig. 10. When a document is evaluated, the first signal to appear is from the photoelectric cell 31 which triggers the 10 millisecond multivibrator in the timer 13 to produce a $C_{sy}1$ pulse as indicated by the graphs A and B of Fig. 11. The $C_{sy}1$ pulse indirectly triggers the reader unblanking multivibrator in the symbol reader and directly triggers the 70 millisecond monostable multivibrator in the timer. The timing of the reader unblanking pulse, which has a duration of approximately 46 milliseconds, is shown in graph C. The negative-going, 70 millisecond, pulse from the monostable multivibrator 82 (Fig. 2) is shown in graph D. It is employed to produce a $Csy2$ pulse shown in graph E. A +6 volt Document Presence signal is transmitted from the sorter control 12 to the flip-flop 65 through the lead 69 the period from the $Csy1$ pulse to the $Csy2$ pulse. During that period the flip-flop 65 is reset, thereby enabling the gated emitter follower circuit (63, 64) and disabling the AND-gates 74 and 75. The AND-gate 66 is also enabled during that period so that the first symbol read on the document causes a Symbol Presence signal to be transmitted through the enabled AND-gate 66 to reset the flip-flops 67 and 68.

All of the auto-correlation signals read from the symbols on the document are transmitted through the enabled emitter follower to the comparators 61 and 62 which are set at level limits of 175% and 75%. It should be noted that the Symbol Presence signal at the output terminal 60 of the symbol reader precedes the auto-correlation signal 48 by approximately 25 microseconds so that the flip-flops 67 and 68 are both reset before the first auto-correlation signal is compared. Since the auto-correlation signal should normally cross the threshold level of the too-high comparator but not cross the threshold level of the too-low comparator, the too-high comparator must transmit a signal to set the flip-flop 67 if the auto-correlation signal level is within the proper limits. If the signal level is too high, the too-high flip-flop 67 is not set. If the signal level is too low, the too-low flip-flop 68 is set.

The condition for reject is that either the too-high flip-flop is not set or that the too-low flip-flop is set. Accordingly, the false side of the too-high flip-flop is connected to the OR-gate 71 and to the AND-gate 74. The true side of the too-low flip-flop 68 is connected to the OR-gate 71 and to the AND-gate 75. The Reject signal from the OR-gate 71 is gated through the AND-gate 70 by a Symbol Identifying signal from an output terminal of the symbol reader, such as the output terminal 49, through the OR-gate 72. The output of the AND-gate 70 sets the flip-flop 65 to inhibit the gated emitter follower circuit (63, 64) and gate the too-high or too-low output signal from either the flip-flop 67 or the flip-flop 68 to the respective indicator 76 or 78 and the respective counter 77 or 79, depending upon whether the auto-correlation signal is too low or too high. The reason for inhibiting the gated emitter follower circuit is to lock the flip-flops 67 and 68 and the indicators 76 and 78 in a too-high or too-low indicating position, depending upon which occurs first, for the duration of the Document Presence signal which persists until the next $Csy2$ pulse resets the control register flip-flop 93 in Fig. 2. The Reject signal from the AND-gate 70 is also applied to the sorter control 12.

Referring now to Fig. 2, the Reject signal transmitted through a lead 73 resets the flip-flop 92, thereby storing a reject signal in the input register. Upon the occurrence of a $Csy2$ pulse, the control register flip-flop 93 is reset, thereby enabling the AND-gate 94. Meantime, the monostable multivibrator 95 which was triggered by a $Iy6$ pulse from the inverter amplifier 91 at the time of a $Csy1$ pulse has returned to its original stable state as shown in graph H of Fig. 10 so that the AND-gate 96 is then enabled and a Reject signal stored in the output register flip-flop 97 as shown in graph L of Fig. 10. When the control register flip-flop 93 is reset and the AND-gate 94 is enabled, a +6 volt signal is transmitted to the output register flip-flop 97 to store a Special Sort signal therein but only if a Special Sort signal is stored in the input register flip-flop 92. When the flip-flop 92 has been reset by a Reject signal, the output register flip-flop 97 remains in a set condition when the control register flip-flop 92 is reset. Upon the occurrence of a $Csy3$ pulse, the multivibrator 98 produces a negative-going Read Out signal of 15 milliseconds in duration to disable the AND-gate 96 and enable the OR-gate 99 which, as noted hereinbefore, functions as an AND-gate. Since the set output terminal of the output register flip-flop 97 is at a +6 volt level, the output terminal of the OR-gate 99 remains at a +6 volt level and the output signal of the emitter follower 110 which is transmitted to the base electrode of the transistor switch 30 in Fig. 1 remains at a +6 volts. Accordingly, transistor 40 remains cut off, the solenoid 29 is not energized and the mechanical gate 27 remains closed, thereby causing the document to be deposited in the Reject pocket 26.

Referring back to Fig. 2, if a Reject signal had not been received through the lead 73 to reset the input register flip-flop 92, the AND-gate 94 transmits a +6 volt signal when the control register flip-flop is reset by the $Csy2$ pulse to reset the output register flip-flop 97 and thereby stored a Special Sort signal therein. The Read Out signals from the monostable multivibrator 98 shown in graph I then enables the OR-gate 99 and a —5 volt signal is transmitted to the base electrode of the emitter follower 110, thereby cutting it off. The output of the emitter follower 110 then drops from +6 volts to 0 volts. The clamping diode 111 prevents the output signal from going below 0 volts. That negative-going signal, which persists for the duration of the 15 microsecond Read Out pulse as shown in the graph M of Fig. 10, is transmitted to the base electrode of the transistor switch 30 in Fig. 1 to actuate the solenoid 29, open the gate 27 and cause the document to be deposited in the Special Sort pocket 28.

After all of the documents have been sorted, the comparators 61 and 62 may be switched to the wider limits of 200% and 50% as described hereinbefore and all of the documents deposited in the Reject pocket 28 again evaluated. The documents deposited in the Special Sort pocket 26 should first be removed and labeled grade A. After all of the rejected documents have been evaluated again, the documents then deposited in the Reject pocket 26 may be labeled grade C. The remaining documents deposited in the Special Sort pocket 28 may be labeled grade B.

The counters 77 and 79 are provided to be able to determine how many of a group of rejected documents are too high and how many are too low. If it is desired to physically separate the documents into two groups, one group consisting of the documents which are too high and the other group consisting of the documents which are too low, it is only necessary to open a switch 900 and again evaluate the rejected documents. By opening the switch 900, the flip-flop 67 is disconnected from the OR-gate 71 and only documents which bear symbols that produce signals that are too low will transmit a Reject signal to the sorter control. Accordingly, only those documents will be deposited in the Reject pocket 26, the others being deposited in the Special Sort pocket 28.

In order to monitor on-line sorting or data processing operations, the evaluating section may be disconnected from the sorter control 12 by opening a switch 910 so that Reject signals cannot operate the sorter through the sorter control. An operator can then watch the indicator lamps and counters to determine whether the documents being processed are producing signal levels predominantly too high or too low.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. An apparatus for evaluating the printing of symbols on documents comprising: a transducer for scanning symbols on a given document; translating means responsive to said transducer for producing at a common output terminal electrical signals characteristic of said symbols; means for comparing the peak voltage level of each of said electrical signals with a standard signal level, said means being coupled to said common output terminal; a sorter having a plurality of compartments for receiving said documents, said sorter including a means for transporting said documents from said transducer to said compartments and a means for separating some of said documents into a given one of said compartments in response to a sorting signal; and control means responsive to said comparing means for transmitting a sorting signal to said separating means in said sorter.

2. An apparatus as specified in claim 1 including a means for indicating whether an electrical signal produced by scanning a symbol on said given document fails to compare in voltage level with said standard signal level.

3. An apparatus for evaluating the printing of symbols on documents comprising: a sorter having a plurality of compartments for receiving documents, said sorter including a means for transporting said documents one at a time past a transducer to said compartments and a means for separating some of said documents into a given one of said compartments in response to sorting signals, said transducer producing electrical signals characteristic of unique symbols printed on said documents; means for translating said electrical signals to a common output terminal; means for comparing the peak voltage level of said electrical signals with standard voltage levels which define a range of acceptable signal levels; means for coupling electrical signals from said common output terminal to said comparing means; and sorter control means responsive to said comparing means for transmitting sorting signals to said means for separating some of said documents into a given one of said compartments of said sorter.

4. An apparatus as defined in claim 3 including visual indicating means for indicating whether an electrical signal produced by scanning a symbol on a given document is too high or too low as compared with said standard voltage levels, said indicating means being coupled to said comparing means.

5. An apparatus as defined in claim 3 including a first counter for counting all of said documents which bear a symbol that produces a signal having a peak voltage too high as compared with a standard voltage level and a second counter for counting all of said documents which bear a symbol that produces a signal having a peak voltage too low as compared to a standard voltage level.

6. An apparatus for evaluating machine readable symbols of the human language printed on documents comprising: a transducer for scanning said symbols on a given document; means responsive to said transducer for producing electrical signals proportionate to electrical signals which are characteristic of said symbols; means for comparing the peak level of each of said proportionate electrical signals with a range of levels between two arbitrary standard signal levels; and means responsive to said comparing means for indicating whether a given proportionate electrical signal fails to compare in peak level with a range of levels between said two standard voltage levels.

7. In an apparatus for evaluating symbols printed on documents, the combination comprising: a transducer for scanning a given symbol on one of said documents and for producing in response thereto a voltage signal characteristic of said symbol; means for comparing the peak level of said voltage signal with a standard signal level, said means being coupled to said transducer; and means for indicating whether said signal fails to compare in peak voltage with said standard signal level.

8. In an apparatus as specified in claim 7, a sorter having a plurality of compartments for receiving said documents, said sorter comprising a means for transporting said document from said transducer to said compartments and a means for separating given ones of said documents into a given one of said compartments in response to sorting signals, and a sorter control means responsive to said comparing means for transmitting sorting signals to said separating means in said sorter.

9. In an apparatus for evaluating symbols printed on documents, the combination comprising: a sorter having a plurality of compartments for receiving documents, said sorter including a means for transporting said documents one at a time past a transducer to said compartments and a means for separating some of said documents into a given one of said compartments in response to a sorting signal, said transducer producing electrical signals characteristic of symbols printed on said documents; means coupled to said transducer for comparing the level of each of said electrical signals with standard signal levels which define a range of acceptable signal levels and for producing sorting signals; and means for translating said sorting signals to said means for separating some of said documents into a given one of said compartments.

10. In an apparatus for evaluating symbols printed on documents, the combination comprising: transducing means for scanning said symbols on a given one of said documents, said transducing means producing electrical signals characteristic of unique symbols printed on said given document; comparing means coupled to said transducing means for comparing the level of said electrical signals with standard voltage levels which define a range of acceptable signal levels; and indicating means coupled to said comparing means for indicating whether an electrical signal produced by scanning a symbol is too high or too low as compared with said standard voltage levels.

11. An apparatus as specified in claim 10 including a sorter having a plurality of pockets and means for transporting some of said documents into a given one of said compartments in response to sorting signals; and a sorter controlling means responsive to said comparing means for transmitting said sorting signals to said means for transporting some of said documents into a given one of said compartments.

12. In an apparatus for evaluating symbols printed on documents, the combination comprising: transducing means for scanning symbols on said documents and for producing in response thereto electrical signals which are characteristic of said symbols; comparing means coupled to said transducing means for comparing the peak level of said signals with a range of levels between two arbitrary signal levels; and sorting means responsive to said comparing means for separating all documents which bear a symbol that causes a characteristic signal having a peak level outside of said range of levels to be produced when scanned.

References Cited in the file of this patent

UNITED STATES PATENTS

| | | |
|---|---|---|
| 2,172,328 | Bryce | Sept. 5, 1939 |
| 2,660,372 | Leclerc | Nov. 24, 1953 |
| 2,798,216 | Goldberg | July 2, 1957 |